(12) United States Patent
Moriyama et al.

(10) Patent No.: US 6,669,296 B2
(45) Date of Patent: Dec. 30, 2003

(54) SEAT RECLINING DEVICE (75) Inventors: Genta Moriyama, Anjo (JP); Naoaki Hoshihara, Obu (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/198,169

(22) Filed: Jul. 19, 2002

(65) Prior Publication Data

US 2003/0025376 A1 Feb. 6, 2003

(30) Foreign Application Priority Data

Jul. 19, 2001 (JP) .................................... 2001-219310

(51) Int. Cl.$^7$ ................................................ B60N 2/02
(52) U.S. Cl. .................... 297/367; 297/366; 297/363; 297/369
(58) Field of Search ................................ 297/366, 367, 297/369, 363, 378.12

(56) References Cited

U.S. PATENT DOCUMENTS

| | | | |
|---|---|---|---|
| 5,681,086 A | | 10/1997 | Baloche |
| 5,816,656 A | * | 10/1998 | Hoshihara et al. .......... 297/367 |
| 5,857,746 A | * | 1/1999 | Barrere et al. .............. 297/367 |
| 6,007,153 A | * | 12/1999 | Benoit et al. .......... 297/378.12 |
| 6,095,608 A | * | 8/2000 | Ganot et al. ................. 297/367 |
| 6,164,723 A | * | 12/2000 | Ganot .................... 297/378.12 |
| 6,318,806 B1 | * | 11/2001 | Levert et al. ................ 297/367 |
| 6,474,740 B1 | * | 11/2002 | Kondo et al. ................ 297/367 |
| 6,554,361 B2 | * | 4/2003 | Reubeuze et al. .......... 297/367 |
| 2002/0033627 A1 | * | 3/2002 | Hoshihara et al. .......... 297/367 |
| 2002/0041119 A1 | * | 4/2002 | Kojima et al. .............. 297/367 |
| 2002/0043852 A1 | * | 4/2002 | Uramichi ..................... 297/366 |
| 2002/0171280 A1 | * | 11/2002 | Okazaki et al. ............. 297/367 |

* cited by examiner

Primary Examiner—Anthony D. Barfield
Assistant Examiner—Erika Garrett
(74) Attorney, Agent, or Firm—Burns, Doane, Swecker & Mathis, LLP (57) ABSTRACT

A seat reclining device includes a first circular shaped concave portion formed in a first arm and a second concave portion which is concentric with the first concave portion and formed inwardly of the first concave portion. The device also includes an engaged portion which is engaged by an engaging portion. The engaged portion is dividing into two engaged portions in which a first engaged portion is formed on the inner surface of the first concave portion and a second engaged portion is formed on the inner surface of the second concave portion. The engaging portion is divided into two engaging portions such that a first engaging portion is engaged with the first engaged portion and a second engaging portion is engaged with the second engaged portion. All the engaging and engaged portion have gears possessing the same angular pitch as each other.

19 Claims, 5 Drawing Sheets

SEAT RECLINING DEVICE

This application is based on and claims priority under 35 U.S.C. §119 with respect to Japanese Application No. 2001-219310 filed on Jul. 19, 2001, the entire content of which is incorporated herein by reference.

FIELD OF THE INVENTION

This invention relates to a seat reclining device, and more particularly, the present invention pertains to a structure of the seat reclining device which is capable of receiving an excessive load.

BACKGROUND OF THE INVENTION

A seat reclining device which is capable of receiving an excessive load is disclosed in U.S. Pat. No. 5,816,656. This known seat reclining device has a lower arm fixed to a seat cushion, an upper arm disposed at a seat back side and capable of rotating with the lower arm, and a locking mechanism which restricts rotation of the upper arm relative to the lower arm. To receive an excessive load, the strength of the device is improved by combining a pair of reclining mechanisms which are constructed with a symmetrical shape to one another. This strengthened seat reclining device is utilized for supporting one side of the seat back where the seat belt is anchored. The seat reclining device supports an excessive load transmitted from the seat belt upon an emergency condition such as a frontal collision of the vehicle.

However, the strength of the above reclining device is achieved by providing the lower arms, the upper arms and the locking mechanisms in pairs respectively. Accordingly, the number of parts is increased as is the manufacturing cost.

Therefore, a need exists for a reclining seat having improved strength without increasing the number of parts to the same extent as in the known reclining device.

SUMMARY OF THE INVENTION

According to one aspect of this invention, a seat reclining device includes a first arm supported by one a seat cushion or a seat back, a second arm supported by the other of the seat cushion and the seat back, and rotatably supported with respect to the first arm, a first circular concave portion formed in the first arm, a second circular concave portion formed in the first arm inside the first concave portion, and a pawl provided with a first outer gear portion and a second outer gear portion each having a plurality of gear teeth. A first inner gear portion having a plurality of gear teeth is formed on the inner peripheral portion of the first circular concave portion, with the first inner gear portion being engageable with the first outer gear portion. A second inner gear portion having a plurality of gear teeth is formed on the inner peripheral portion of the second circular concave portion, with the second inner gear portion being engageable with the second outer gear portion.

The seat reclining device is able to lock the position of the seat back relative to the seat cushion by engaging the first and second engaging portions of the pawls with the first and second engaged portions of the first arm.

According to another aspect, a seat reclining device includes a first arm supported by a seat cushion or a seat back, and a second arm rotatably supported with respect to the first arm and supported by the other of the seat cushion and the seat back. The first arm possesses a first annular recessed portion having an inner diameter, with the first annular recessed portion having a circumferentially extending inner periphery at which is provided a first inner toothed portion and with the first inner toothed portion extends along at least a portion of a circumferential extent of the inner periphery of the first annular recessed portion. The first arm also possesses a second annular recessed portion having an inner diameter different from the inner diameter of the first annular recessed portion. The second annular recessed portion has a circumferentially extending inner periphery at which is provided a second inner toothed portion, with the second inner toothed portion extending along at least a portion of a circumferential extent of the inner periphery of the second annular recessed portion. A plurality of pawls are positioned between the first and second arms, with each of the pawls possessing a first outer toothed portion and a second outer toothed portion, and with the first outer toothed portion and the second outer toothed portion of each pawl being offset from one another. The first outer toothed portion on each pawl is engageable with the first inner toothed portion to rotatably fix the first and second arms relative to one another, and the second outer toothed portion on each pawl is engageable with the second inner toothed portion.

According to another aspect, a seat reclining device includes a first arm supported by a seat cushion or a seat back, and a second arm supported by the other of the seat cushion and the seat back, with the first and second arms being supported for relative rotation about a rotational axis. The first arm is provided with an annularly arranged first inner toothed portion centered on the rotational axis and an annularly arranged second inner toothed portion centered on the rotational axis, with the second inner toothed portion being spaced from the rotational axis by a radial distance different from the radial distance between the first inner toothed portion and the rotational axis. A pawl is slidably positioned between the first and second arms for slidably moving towards and away from the rotational center. The pawl possesses a first outer toothed portion and a second outer toothed portion, with the first outer toothed portion of the pawl and the second outer toothed portion of the pawl being offset from one another. The first outer toothed portion on the pawl is adapted to be engaged with the first inner toothed portion and the second outer toothed portion on the pawl is adapted to be engaged with the second inner toothed portion.

BRIEF DESCRIPTION OF THE DRAWING FIGURES

The foregoing and additional features and characteristics of the present invention will become more apparent from the following detained description considered with reference to the accompanying drawing figures in which like reference numerals designate like elements.

DETAILED DESCRIPTION OF THE INVENTION

Figure 7:
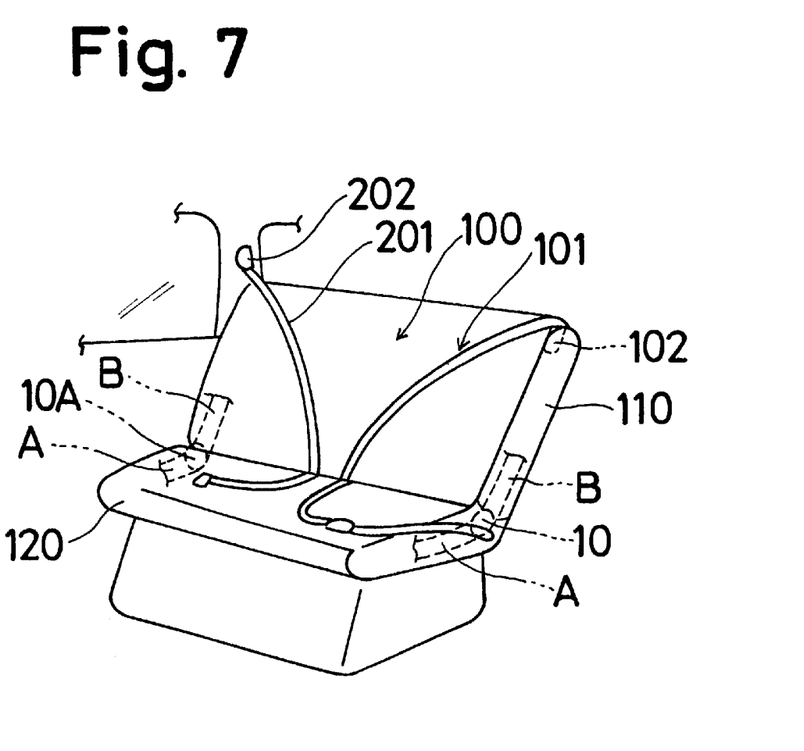
FIG. 7 is a perspective view of a seat in which the seat reclining device of the invention is mounted.

As shown in FIG. 7, a seat reclining device 10 having improved strength in accordance with the present invention is disposed at the left side of a seat 100, considered with reference to the vehicle longitudinal direction. The seat 100 is of a size sufficient to seat two or more passengers.

The seat 100 has a seat back 110, a seat cushion 120, and at least two seat belts 101, 201. An end of one of the seat belts 101 is fixed by an installation portion 102 which is located at an upper part of the seat back 110, while the other seat belt 201 (an end of the seat belt) is fixed by an installation portion 202 such as a pillar portion of the body of the vehicle. With a seat constructed in this way, upon an emergency condition such as the occurrence of a vehicle frontal collision, the seat belt 101 side of the seat back 110 receives a greater load than the seat belt 201 side of the seat back 110 through the installation portion 102. Therefore, the seat reclining device 10 has to have sufficient strength. On the other hand, at the seat belt 201 side, the seat reclining device 10A need not necessarily exhibit the same strength characteristics because that side does not receive an excessive load and so it is possible to use a normal or conventional seat reclining device 10A.

Figure 1:
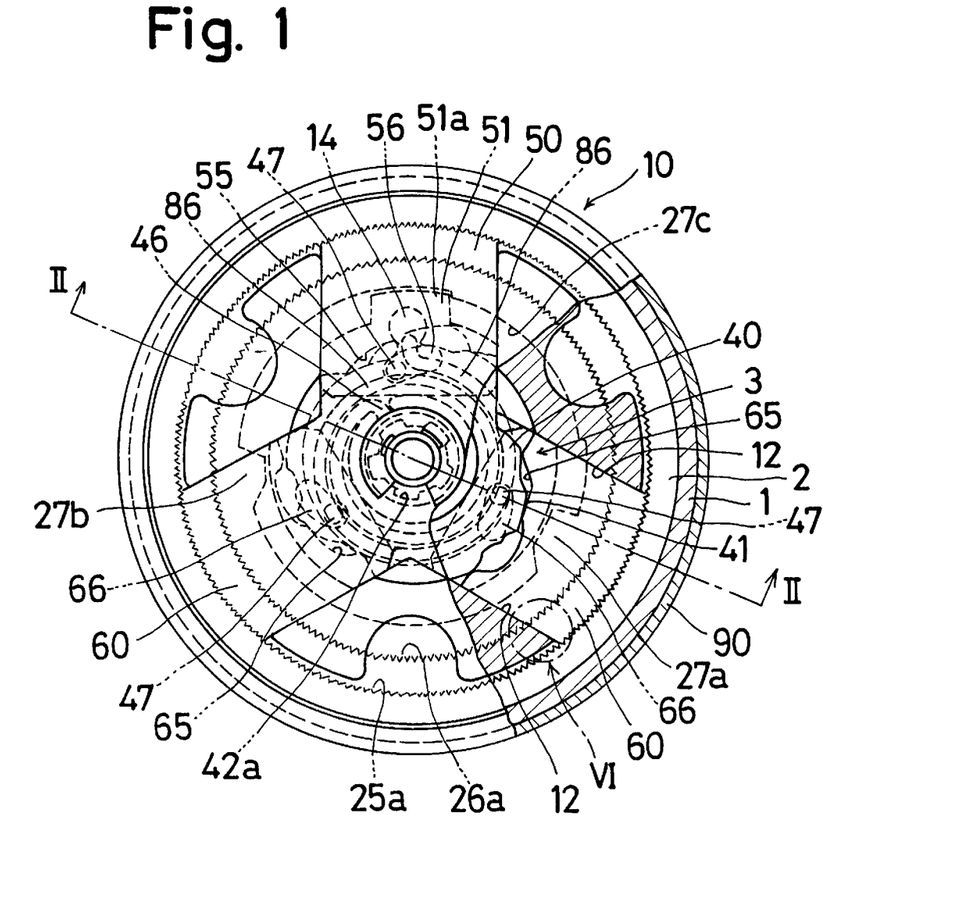
FIG. 1 is a plan view, partially in cross-section, of a seat reclining device according to an embodiment of the invention.
Figure 2:
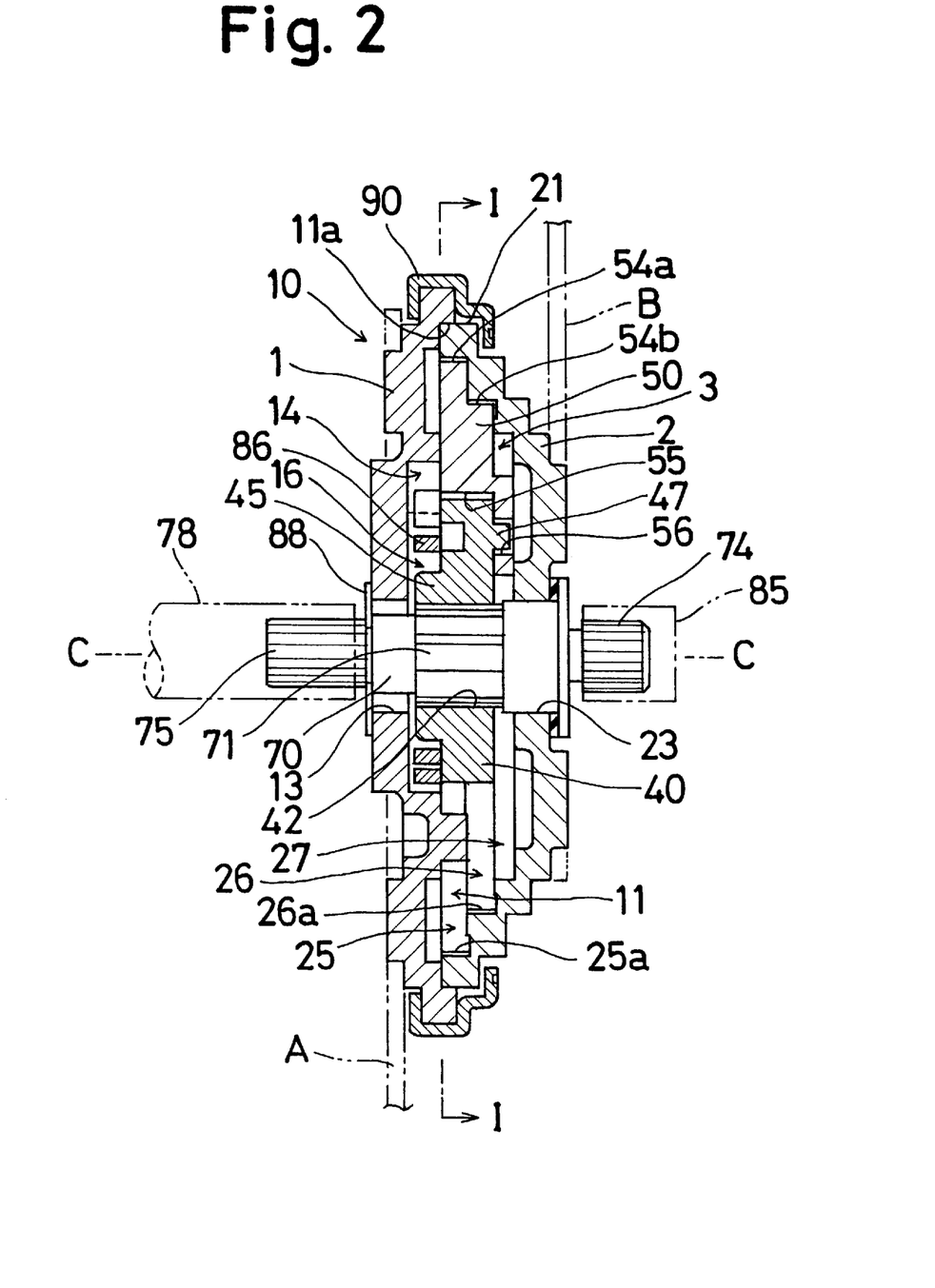
FIG. 2 is a cross-sectional view taken along the section line II—II in FIG. 1.

As shown in FIG. 1 and FIG. 2, the seat reclining device 10 has a lower arm 1 and an upper arm 2, both of which are round or annular disc-shaped elements. The lower arm 1 is fixed to a seat cushion frame A by welding and the upper arm 2 is fixed to a seat back frame B by welding. The lower arm 1 and the upper arm 2 are assembled in opposing and overlapping relation to one another.

In the lower arm 1, a concave or recessed portion 11 is formed by pressing metal material in the thickness direction, in other words by a half die cutting method. The concave or recessed portion 11 opens toward the upper arm 2 and has an inner peripheral surface 11a. The center of the inner peripheral surface 11a coincides with the rotation axis C about which relative rotation of the the upper arm 2 and the lower arm 1 occurs.

A circular outer peripheral surface 21 of the upper arm 2 is slidably disposed at the inner peripheral surface 11a. The outer peripheral surface 21 of the upper arm 2 and the inner peripheral surface 11a of the lower arm 1 function as a bearing shaft and a bearing respectively when they rotate mutually.

Furthermore, a holder 90 is disposed on the lower arm 1 and covers a portion of the outer periphery of the upper arm 2. The inner surface of the holder 90 is in contact with a portion of the outer side surface of the lower arm 1 and supports the lower arm 1. By the above construction, the upper arm 2 and the lower arm 1 are structured to rotate relative to one another.

In the upper arm 2, a circular shaped concave or recessed portion 25 is formed by half die cutting. The concave or recessed portion 25 opens toward the lower arm 1. Formed along the entire circumference of the inner peripheral portion of the recessed portion 25, whose pivot coincides with the rotation axis C, is a first inner gear 25a (i.e., a first engaged portion).

Located inside the recessed portion 25 is a circular concave or recessed portion 26 that is formed by half die cutting one step deeper than the concave 25. Thus, the recessed portion 26 is located radially inwardly of and is deeper than the recessed portion 25. The recessed portion 26 thus possesses a smaller inner diameter than the recessed portion 25. Formed along the entire circumference of the inner peripheral portion of the recessed portion 26 is a second inner gear 26a (i.e., a second engaged portion). The second inner gear 26a has gear teeth formed to possess the same angular pitch with the gear teeth of the first inner gear 25a, although the pitch circle diameter of the second inner gear 26a is smaller than that of the first inner gear 25a.

In addition, inside the recessed portion 26, a circular concave or recessed portion 27 is formed by half die cutting one step deeper than the concave portion 26. Thus, the recessed portion 27 is located radially inwardly of and is deeper than the recessed portion 26. The recessed portion 27 thus possesses a smaller inner diameter than the recessed portion 26. Also, the recessed portions 25, 26, 27 are concentrically positioned.

On the inner peripheral surface of the recessed portion 27, a first stopper portion 27a and a second stopper portion 27b are provided. These stoppers 27a, 27b project toward the rotation axis C and are formed or positioned at angular intervals for defining the reclining angle range of the seat reclining device 10. Also, a projection portion or (lock control profile 27c is formed between the first stopper portion 27a and the second stopper portion 27b. The projection portion 27c is formed lower than the first stopper 27a or the second stopper 27b.

Figure 3:
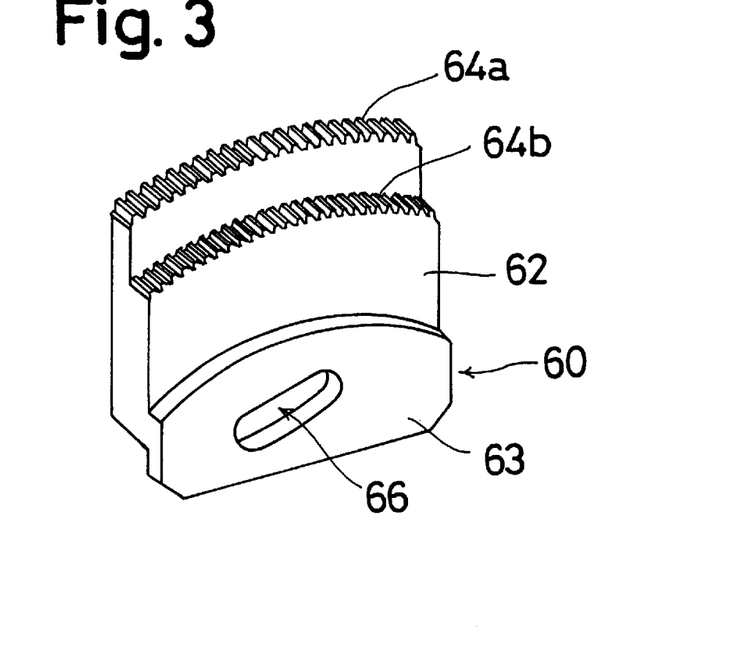
FIG. 3 is a perspective view of one version of the pawl used in the seat reclining device shown in FIGS. 1 and 2.
Figure 4:
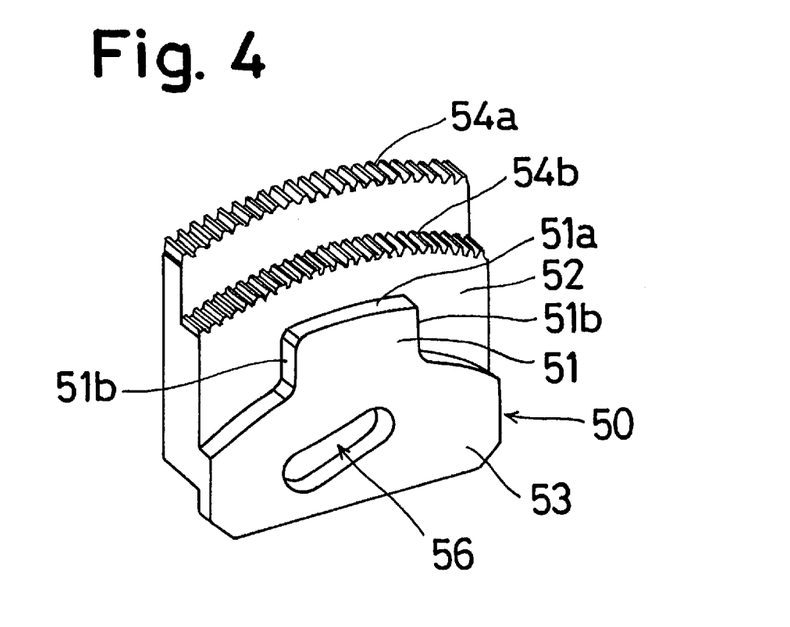
FIG. 4 is a perspective view of another version of the pawl used in the seat reclining device shown in FIGS. 1 and 2.

A locking mechanism 3 is disposed between the lower arm 1 and the upper arm 2. The locking mechanism 3 includes a cam 40 and a plurality of pawls disposed within a surface which is orthogonal to the rotation axis C and positioned at equal angular intervals respectively. In the illustrated embodiment, the locking mechanism 3 includes three pawls. Each of the pawls is constituted by one of two different types of pawls 50, 60 as shown in FIGS. 3 and 4. The pawls 50, 60 are identical in shape or configuration, except that the pawl 50 (i.e., a first pawl) has a projection 51 on one side surface while the other pawl 60 (i.e., a second pawl) does not have such a projection. In the illustrated embodiment, the locking mechanism includes one of the pawls 50 shown in FIG. 4 and two of the pawls 60 shown in FIG. 3.

The pawls 50, 60 can be made by a manufacturing method such as forging from plate-shaped steel material. As seen in FIGS. 3 and 4, each of the pawls 50, 60 has a first surface portion 52, 62 and a second surface portion 53, 63. The first and second surface portions of each pawl 50, 60 are joined mutually with a step, and are similar to rectangular in appearance. The end surface of the first surface portion 52, 62 of each pawl is formed with two additional steps at which are provided first outer gears or toothed portions 54a, 64a (i.e., a first engaging portion) adapted to be engaged with the first inner gear 25a of the upper arm 2, and second outer gears or toothed portions 54b, 64b (i.e., a second engaging portion) adapted to be engaged with the second inner gear 26a. Thus, each of the pawls 50, 60 includes an outer edge surface provided with the first outer gear 54a, 64a, a ledge provided with the second outer gear 54b, 64b, and a further ledge defining the transition between the first surface portion 52, 62 and first outer gear 54a of the pawl 50 is thus offset from the second outer gear 54a the second surface portion 53, 63. The first outer gear 54a of the pawl 50 is thus offset from the second outer gear 54a, while the first outer gear 64a of each pawl 60 is offset from the second outer gear 64a.

The angular pitch of the teeth of the first outer gears 54a, 64a is the same with that of the second outer gears 54b, 64b, although the pitch circle diameter of the second outer gears 54b, 64b is smaller than that of the first outer gears 54a, 64a.

Figure 6:
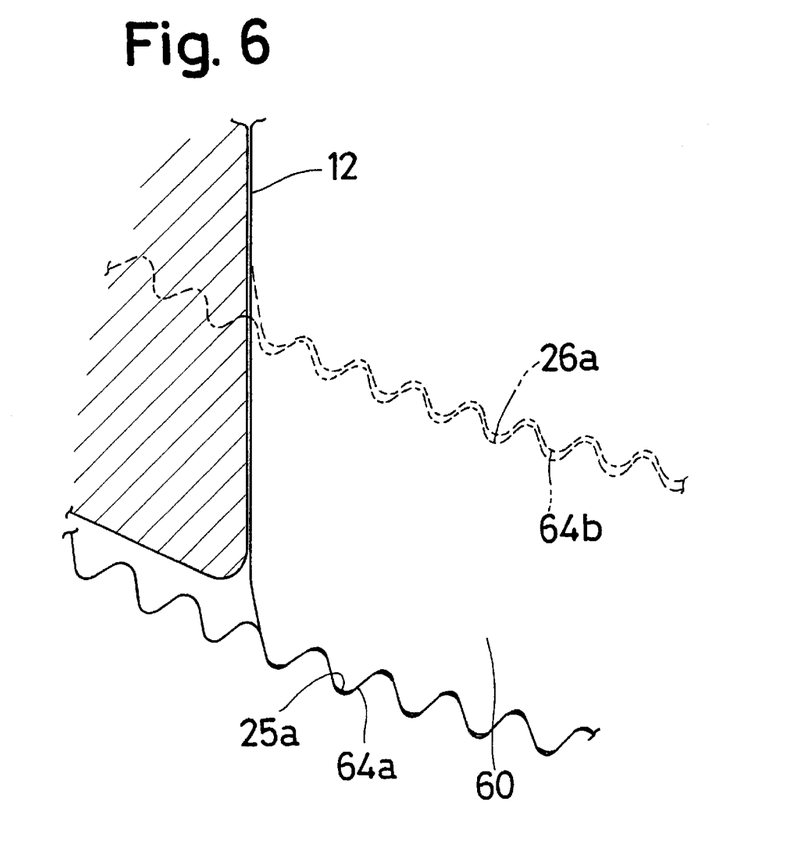
FIG. 6 is an enlarged view of the portion of the seat reclining device identified as VI in FIG. 1.

As shown in FIG. 6, when the first inner gear 25a of the upper arm 2 and the first outer gears 54a, 64a of the pawls 50, 60 are engaged with one another, the second inner gear 26a and the second outer gears 54b, 64b are positioned to form or provide a slight clearance.

Figure 5:
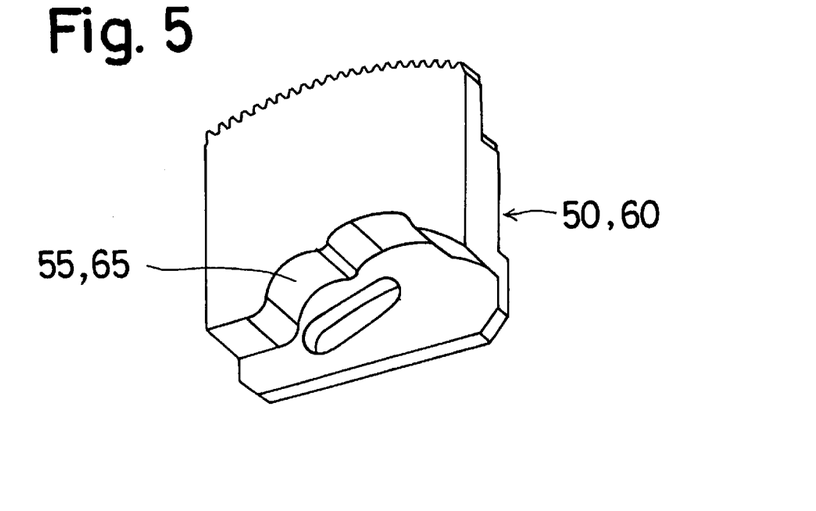
FIG. 5 is a rear perspective view of the pawl shown in FIG. 3 or FIG. 4 illustrating the back surface.

Also, as shown in FIGS. 1 and 5, the back side of each pawl 50, 60 opposite the side illustrated in FIGS. 3 and 4 is provided with a cam surface 55, 65. In other words, the cam surfaces 55, 65 are formed at the back sides of the first surface portions 52, 62 and the second surface portions 53, 63. The second surface portion 53, 63 of each pawl is also provided with a somewhat elongated cam hole 56, 66 that extend completely through the thickness of the pawl 50, 60. As shown in FIGS. 3 and 4, the end surfaces of the side widths of each pawl 50, 60 are formed linearly, having a determined dimension in the vertical direction.

As shown in FIG. 2, three pairs of projecting guide walls 12 are positioned within the recessed or concave portion 11 of the lower arm 1. The guide walls 12 forming each pair of guide walls 12 are spaced apart a distance that is about the same as the side widths of the pawls 50, 60. Each of the pawls 50, 60 is slidably disposed between a respective pair of the guide walls 12, and each pawl 50, 60 is able to slide along the guide walls 12 to and move toward or away from the rotation axis C.

The cam 40 is rotatable about the center of the rotation axis C and includes a plurality of cam surfaces 41 disposed within the recessed portions 25, 26 of the upper arm 2. In the illustrated embodiment, the cam 40 is provided with three cam surfaces 41 circumferentially spaced apart and positioned at equal angular intervals. The cam surfaces 41 are positioned to contact the respective cam surfaces 55, 65 of the pawls 50, 60. The cam surfaces 41 thus contact the pawls 50, 60 and press the first and the second outer gears 54a, 64a, 54b, 64b into engagement with the first and second inner gears 25a, 26a through rotation of the cam 40 in the counterclockwise direction from the position shown in FIG. 1.

One of the side surfaces of the cam 40 is provided with projecting pins 47 which are disposed closer to the rotation axis C than the cam surfaces 41. Each of the projecting pins 47 is positioned in the cam hole 56, 66 of one of the pawls 50, 60. The cam holes 56, 66 are configured to cause the first and second outer gears 54a, 64a, 54b, 64b of the pawls 50, 60 to be disengaged from the first and second inner gears 25a, 26a respectively when the cams 40 are rotated in the clockwise direction by the projecting pins 47 from the position shown in FIG. 1.

As shown in FIGS. 1 and 2, a hinge shaft 70 is disposed at the rotation axis C. This hinge shaft 70 passes through inserting holes 13, 42, 23 disposed in the lower arm 1, the cam 40, and the upper arm 2 respectively. At around the center of the axial direction of the hinge shaft 70, a spline 71 is formed with a plurality of grooves. The plurality of grooves open toward the outer periphery of the hinge shaft 70, extend in the direction of the rotation axis C and are formed on an outer surface of the hinge shaft 70. A female spline 42a is provided at the inner periphery of the inserting hole 42 of the cam 40. The female spline 42a is engaged with the spline 71 of the hinge shaft 70 so that the hinge shaft 70 and the cam 40 are rotatable together. The hinge shaft 70 is fixed by a binding ring 88.

In addition, as shown in FIG. 2, a serration 74 providing a plurality of teeth spaces extending in the axial direction is formed on the outer periphery of the hinge shaft 70 at one end of the hinge shaft 70. An operational lever 85 os provided with a hole also formed with a serration that is complementary to the serration 74 on the hinge shaft 70. The serration on the hole of the operational lever 85 engages the serration 74 of the hinge shaft 70 so that the operational lever 85 is fixedly attached on the hinge shaft 70. The cam 40 is adapted to be rotated by operating the operational lever 85.

Additionally, a serration 75 is disposed on the other end portion of the hinge shaft 70, and a connecting rod 78 is connected to this other end portion of the hinge shaft 70 y way of the serration 75. The connecting rod 78 is connected to the hinge shaft of the other reclining device 10A. Thus, with this construction, the reclining devices 10, 10A can be operated simultaneously to lock and unlock the seat back 110.

As shown in FIGS. 1 and 2, a circular concave or recessed portion 16 is formed in the lower arm 1. This circular recessed portion 16 is concentric with the concave portion 11 and is formed by half die cutting one step deeper than the concave portion 11. A groove 14 extending outwardly in the radial direction is formed on the inner periphery surface of the circular recessed portion 16. A groove 46 is also formed on a boss portion 45 of the cam 40. One end of a spring 86 is hooked in the groove 14, and the other end of the spring 86 is hooked in the groove 46. The spring 86 is spiral-shaped, with the center of the spring 86 practically corresponding to the center of the rotation axis C. The spring 86 applies a force to the cam 40 to rotate the cam 40 in the counterclockwise direction, whereby the cam surfaces 41 of the cam 40 are pressed against the cam surfaces 55, 65 of the pawls 50, 60. Consequently, by pressing the cam surfaces 55, 65, the spring 86 causes each of the outer gears 54a, 54b, 64a, 64b to be firmly engaged with the respective inner gears 25a, 26a.

The reclining device 10 constructed according to the embodiment described above operates in the following manner. FIG. 1 shows the condition in which the reclining device 10 is in the locked position. When the reclining device 10 is in the locked position, the cam surfaces 41 of the cam 40 are in contact with the respective cam surfaces 55, 65 of the pawls 50, 60 and so the pawls 50, 60 are pressed radially outwardly by the cam 40. As a result, the outer gears 54a, 54b, 64a, 64b of the pawls 50, 60 are engaged with the respective inner gears 25a, 26a of the upper arm 2. Because of these engagements, relative rotation between the upper arm 2 and the lower arm 1 is restricted or prevented.

When the operational lever 85 is operated under this condition, from the position shown in FIG. 1, the hinge shaft 70 is rotated together with the cam 40 in the clockwise direction, thus rotating the hinge shaft 70 against the spring force of the spring 86. The cam surfaces 41 of the cam 40 are thus disengaged from the cam surfaces 55, 65 of the pawls 50, 60. At the same time, because the cam holes 56, 66 of the pawls 50, 60 are in contact with the projecting pins 47 on the cam 40, the pawls 50, 60 are pulled radially inwardly toward the rotation axis C along the guide walls 12. Because the pawls 50, 60 are pulled toward the rotation axis C, the outer gears 54a, 54b, 64a, 64b of the pawls 50, 60 are disengaged from the respective inner gears 25a, 26a of the upper arm 2. Consequently, the reclining device 10 assumes the unlocked condition. Also, the reclining device 10A connected with the reclining device 10 by the connecting rod 78 is also unlocked. With the reclining devices 10, 10A in the unlocked condition, the seat back 110, which is supported by the seat back frame B, can be adjusted relative to the seat cushion 120, which is supported by the seat cushion frame A.

When the reclining device 10 is unlocked and the seat back 110 is pivoted or moved in the forward direction at an angle deviating or different from the angle or predetermined angle defining a sitting position, the projection 27c formed in the inner peripheral surface of the recessed portion 27 of the upper arm 2 is rotated in the counterclockwise direction from the position shown in FIG. 1, and moves to a position between the projection 51 formed in the side surface of the pawl 50 and the inner gears 25a, 26a. Then, even if the operational lever 85 is released under this condition, the outer gears 54a, 54b do not engaged the inner gears 25a, 26a, because the projection 27c is engaged with the projection 51. While the projection 27c is engaged with the projection 51, the cam 40 is kept in an unlocked position by one of the projecting pins 47. Therefore, the other two pawls 60 which are operated by the cam 40 are also kept disengaged from the inner gears 25a 26a. Within the angular range in which the projection 27c is formed, the seat back is not locked but is rotatable. Normally, a spring device which functions to move or pivot the seat back 110 in the forward direction relative to the seat cushion is provided, and within the angular range of the projection 27c the seat back 110 rotates over a wide angular range at once so as to make it relatively easy for an occupant to get into and out of a back seat.

When the seat back is rotated in the forward direction completely, in other words when the upper arm 2 is rotated to the forwardmost position in the counterclockwise direction relative to the lower arm 1 from the position shown in FIG. 1, the side surface 51b of the projection 51 of the pawl 50 is engaged by the first stopper 27a to stops further rotation of the upper arm 2 relative to the lower arm 1. The engagement between the side surface 51b of the projection 51 of the pawl 50 and the first stopper 27a thus defines the forwardmost rotation position of the seat back.

When an occupant wishes to be seated by moving the position of the seat back to an appropriate position, the operational lever 85 is operated to thereby disengage the pawls 50, 60 from the inner gears 25a, 26a, with the seat back then being raised.

Disposed in the inner peripheral surface of the recessed portion 27 of the upper arm 2 is not only the first stopper 27a which regulates the maximum angle when the seat back is rotated to a position in the forward direction, but also the second stopper 27b which regulates the maximum reclining angle when the seat back is rotated backward. The operation mechanism here is the same as when the first stopper 27a is operated. That is, the projection 51 is engaged with the stopper 27b and stops further rotation of the upper arm 2 relative to the lower arm. With respect to the maximum reclining position in the backward direction, it is possible to adjust the reclining device 10 to rotate over a wide angular range so that the seat back can be positioned flat with respect to the seat cushion.

As described above, under normal operation of the locking mechanism of the reclining device 10, because the locking mechanism 3 is structured so that only the first inner gear 25a is engaged with the first outer gears 54a, 64a of the pawls 50, 60, there is no clearance between the first inner gear 25a and the first outer gears 54a, 64a. Therefore, the first engaging portion is not affected by vibration. However, when an emergency condition occurs such as a frontal collision, and the seat back receives an excessive load from the seat belt 101 in the forward direction, slight deformations of the first inner gear 25a and the first outer gears 54a, 64a can occur. As a result, the slight clearance between the second inner gear 26a and the second outer gears 54b, 64b disappears, and the second inner gear 26a and the second outer gears 54b, 64b become engaged with each other, thus sharing the excessive load with the first engaging portion.

According to the disclosed embodiment of the present invention, under normal operation of a reclining device locking mechanism, by engaging a pair of outer gears of pawls with an inner gear of an upper arm, a firm locking condition which does not generate significant abnormal noise or dysfunction by vibration and the like can be achieved. Furthermore, when an excessive load takes effect, the strength of the reclining device can be improved by engaging another set of outer gears of the pawls with an inner gear of an upper arm, thus sharing the excessive load with the first set of engaging portions.

Also, by forming two outer gears on one pawl and two inner gears on the upper arm, the strength of the reclining device can be improved without increasing the number of parts.

Additionally on an actual manufacturing process of the upper arm 2, by cutting off the outer portion of the upper arm 2 of the reclining device 10, or otherwise suitably providing such an upper arm, the upper arm for the reclining device 10A having one inner gear can be formed. Thus the same manufacturing stamping die is available for manufacturing another kind of reclining device which is mounted on the other side of the seat, thus facilitating a relatively low cost manufacturing process.

The principles, preferred embodiment and modes of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat reclining device comprising:
   a first arm supported by one of a seat cushion and a seat back;
   a second arm supported by the other of the seat cushion and the seat back, the second arm being rotatably supported with respect to the first arm;
   a first circular concave portion formed in the first arm;
   a second circular concave portion formed in the first arm inside the first concave portion;
   a pawl provided with a first outer gear portion and a second outer gear portion each having a plurality of gear teeth;
   a first inner gear portion having a plurality of gear teeth formed on an inner peripheral portion of the first circular concave portion, the first inner gear portion being engageable with the first outer gear portion; and
   a second inner gear portion having a plurality of gear teeth formed on an inner peripheral portion of the second circular concave portion, the second inner gear portion being engageable with the second outer gear portion.

2. The seat reclining device according the claim 1, wherein the first outer gear portion engages the first inner gear portion in a locked condition of the seat reclining device, and the second outer gear portion engages the second inner gear portion with a clearance which disappears upon application of an excessive load applied on the first or the second arm which exceeds a predetermined value.

3. The seat reclining device according the claim 1, wherein the first and second outer gear portions and the first and second inner gear portions have the same angular gear pitch.

4. The seat reclining device according the claim 1, wherein the first inner gear portion is formed along the entire circumferences of the inner peripheral portion of the first concave portion and the second inner gear portion is formed along the entire circumference of the inner peripheral portion of the second concave portion.

5. The seat reclining device according the claim 1, including a plurality of pawls, a side surface of at least one of the pawls having a projection which is engageable with a lock control profile formed in an inner peripheral surface of a third circular concave portion formed inside the second circular concave portion.

6. A seat reclining device comprising:
a first arm supported by one of a seat cushion and a seat back;
a second arm supported by the other of the seat cushion and the seat back, the second arm being rotatably supported with respect to the first arm;
the first arm possessing a first annular recessed portion having an inner diameter;
the first annular recessed portion having a circumferentially extending inner periphery at which is provided a first inner toothed portion, the first inner toothed portion extending along at least a portion of a circumferential extent of the inner periphery of the first annular recessed portion;
the first arm possessing a second annular recessed portion having an inner diameter different from the inner diameter of the first annular recessed portion;
the second annular recessed portion having a circumferentially extending inner periphery at which is provided a second inner toothed portion, the second inner toothed portion extending along at least a portion of a circumferential extent of the inner periphery of the second annular recessed portion;
a plurality of pawls positioned between the first and second arms, each of the pawls possessing a first outer toothed portion and a second outer toothed portion, the first outer toothed portion and the second outer toothed portion of each pawl being offset from one another;
the first outer toothed portion on each pawl being engageable with the first inner toothed portion to rotatably fix the first and second arms relative to one another; and
the second outer toothed portion on each pawl being engageable with the second inner toothed portion.

7. The seat reclining device according the claim 6, wherein the first and second outer toothed portions and the first and second inner toothed portions have an angular gear pitch that is the same.

8. The seat reclining device according the claim 6, including a cam having a plurality of cam surfaces, each of the cam surfaces being engageable with one of the pawls to urge the pawls in a direction causing the first outer toothed portion on each pawl to engage the first inner toothed portion.

9. The seat reclining device according the claim 8, including a spring operatively associated with the cam to urge the cam in a direction causing the cam surfaces to engage the pawls.

10. The seat reclining device according the claim 6, wherein the second outer toothed portion of each pawl is positioned on one side of the pawl, each pawl including a cam surface positioned on a side of the pawl opposite the side on which the second outer toothed portion is positioned.

11. The seat reclining device according the claim 10, including a cam having a plurality of cam surfaces, each of the cam surfaces being engageable with the cam surface of one of the pawls to urge the pawls in a direction causing the first outer toothed portion on each pawl to engage the first inner toothed portion.

12. The seat reclining device according the claim 6, wherein the first inner toothed portion is formed along the entire circumferences of the inner peripheral portion of the first recessed portion and the second inner toothed portion is formed along the entire circumference of the inner peripheral portion of the second recessed portion.

13. The seat reclining device according the claim 6, wherein the first arm includes a third annular recessed portion having an inner diameter less than the inner diameter of the second annular recessed portion, a side surface of each pawl being provided with a projection which is engageable with a projection formed in an inner peripheral surface of the third annular recessed portion.

14. The seat reclining device according the claim 6, including a cam having portions engageable with the pawls to urge the pawls in a direction causing the first outer toothed portion on each pawl to engage the first inner toothed portion, each of the pawls being provided with a slot, the cam including a plurality of projecting pins each of which is positioned in the slot in one of the pawls.

15. A seat reclining device comprising:
a first arm supported by one of a seat cushion and a seat back;
a second arm supported by the other of the seat cushion and the seat back, the first and second arms being supported for relative rotation about a rotational axis;
the first arm being provided with an annularly arranged first inner toothed portion centered on the rotational axis;
the first arm being provided with an annularly arranged second inner toothed portion centered on the rotational axis, the second inner toothed portion being spaced from the rotational axis by a radial distance different from the radial distance between the first inner toothed portion and the rotational axis;
a pawl slidably positioned between the first and second arms for slidably moving towards and away from the rotational center;
the pawl possessing a first outer toothed portion and a second outer toothed portion;
the first outer toothed portion of the pawl and the second outer toothed portion of the pawl being offset from one another; and
the first outer toothed portion on the pawl being engageable with the first inner toothed portion and the second outer toothed portion on the pawl being engageable with the second inner toothed portion.

16. The seat reclining device according the claim 15, wherein the second outer toothed portion of the pawl is positioned on one side of the pawl, the pawl including a cam surface positioned on a side of the pawl opposite the side on which the second outer toothed portion is positioned.

17. The seat reclining device according the claim 16, including a cam having a cam surface engageable with the cam surface of the pawl to urge the pawl in a direction away from the rotational axis to cause the first outer toothed portion on the pawl to engage the first inner toothed portion.

18. The seat reclining device according the claim 17, including a spring operatively associated with the cam to urge the cam in a direction causing the cam surface of the cam to engage the cam surface of the pawl.

19. The seat reclining device according the claim 15, including a cam having a portion engageable with the pawl to urge the pawl away rom the rotational axis to cause the first outer toothed portion to engage the first inner toothed portion, the pawl being provided with a slot, the cam including a projecting pin positioned in the slot in the pawl.

* * * * *